(12) United States Patent
Kvochko et al.

(10) Patent No.: US 10,990,695 B2
(45) Date of Patent: Apr. 27, 2021

(54) POST-RECORDING, PRE-STREAMING, PERSONALLY-IDENTIFIABLE INFORMATION ("PII") VIDEO FILTERING SYSTEM

(71) Applicant: Bank of America Corporation, Charlotte, NC (US)

(72) Inventors: Elena Kvochko, New York, NY (US); Maria Carolina Barraza Enciso, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/561,287

(22) Filed: Sep. 5, 2019

(65) Prior Publication Data
US 2021/0073412 A1    Mar. 11, 2021

(51) Int. Cl.
*G06N 20/00*    (2019.01)
*G11B 27/02*    (2006.01)
(Continued)

(52) U.S. Cl.
CPC ...... *G06F 21/6245* (2013.01); *G06K 9/00711* (2013.01); *G06K 9/6263* (2013.01);
(Continued)

(58) Field of Classification Search
CPC .......................... G06F 21/6245; G06N 20/00; G06K 9/00711; G06K 9/6263; G06T 1/0042;
(Continued)

(56) References Cited

U.S. PATENT DOCUMENTS 6,529,234 B2   3/2003   Urisaka et al.
7,933,989 B1   4/2011   Barker et al.
(Continued)

OTHER PUBLICATIONS

"Health Insurance Portability and Accountability Act of 1996," https://www.govinfo.gov/content/pkg/PLAW-104publ191/pdf/PLAW-104publ191.pdf, Aug. 21, 1996.
(Continued)

*Primary Examiner* — Thai Q Tran
*Assistant Examiner* — Jose M Mesa
(74) *Attorney, Agent, or Firm* — Weiss & Arons LLP; Michael A. Springs, Esq.

(57) ABSTRACT

Apparatus and methods are provided for post-recording, pre-streaming, pre-storing, video filtering and processing of personally-identifiable information ("PII"). The system may include a video recording device operable to record videos. The system may include a machine-learning, artificially-intelligent filtering module. The filtering module may receive recorded videos from the video recording device. The filtering module may analyze the recorded video to identify PII included in the recorded videos. The filtering module may delete the identified PII. The filtering module may enable streaming of the recorded video absent the PII. The system may include a streaming module. The streaming module may stream the video to a physical storage medium. The system may include a storage medium. The storage medium may receive the recorded streamed video absent the PII.

11 Claims, 3 Drawing Sheets

(51) Int. Cl.
  *G06F 21/62* (2013.01)
  *G06K 9/00* (2006.01)
  *H04L 29/06* (2006.01)
  *G06T 1/00* (2006.01)
  *G06K 9/62* (2006.01)

(52) U.S. Cl.
  CPC ........... *G06N 20/00* (2019.01); *G06T 1/0042* (2013.01); *G11B 27/02* (2013.01); *H04L 65/602* (2013.01)

(58) Field of Classification Search
  CPC .............. H04L 65/602; H04N 21/2343; H04N 21/2355; G11B 27/02
  See application file for complete search history.

(56) References Cited

U.S. PATENT DOCUMENTS

| | | | |
|---|---|---|---|
| 9,293,016 | B2 | 3/2016 | Friedman |
| 9,916,493 | B2 | 3/2018 | Begeja et al. |
| 9,922,514 | B2 | 3/2018 | Gagvani et al. |
| 9,997,056 | B2 | 6/2018 | Bleisch |
| 10,044,990 | B2 | 8/2018 | Mahar et al. |
| 10,073,929 | B2 | 9/2018 | Vaynriber et al. |
| 10,088,841 | B2 | 10/2018 | Kerzner |
| 10,157,537 | B1 | 12/2018 | Coxwell |
| 10,205,913 | B2 | 2/2019 | Smith et al. |
| 10,580,272 | B1* | 3/2020 | Edwards .............. G06K 9/3258 |
| 2010/0115282 | A1* | 5/2010 | Amsterdam .......... G06T 1/0028 713/176 |
| 2012/0075465 | A1 | 3/2012 | Wengrovitz et al. |
| 2012/0317507 | A1 | 12/2012 | Gutierrez et al. |
| 2013/0024788 | A1 | 1/2013 | Olsen et al. |
| 2013/0227594 | A1* | 8/2013 | Boone ................ G06Q 20/3674 725/5 |
| 2015/0006580 | A1 | 1/2015 | Iakovlev |
| 2015/0121082 | A1* | 4/2015 | Carapelli ................ G09C 5/00 713/176 |
| 2016/0026875 | A1 | 1/2016 | Matsumoto et al. |
| 2016/0156823 | A1 | 6/2016 | Yoshida et al. |
| 2017/0048245 | A1 | 2/2017 | Owen et al. |
| 2017/0076572 | A1 | 3/2017 | Rao |
| 2017/0124348 | A1 | 5/2017 | Pourzandi et al. |
| 2018/0143430 | A1 | 5/2018 | Koppal et al. |
| 2019/0042851 | A1 | 2/2019 | Varadarajan et al. |
| 2019/0236342 | A1 | 8/2019 | Madden et al. |
| 2019/0268537 | A1 | 8/2019 | Jang |
| 2019/0297131 | A1 | 9/2019 | Orsini |
| 2019/0304506 | A1 | 10/2019 | Michaud et al. |
| 2019/0377901 | A1* | 12/2019 | Balzer ................. H04L 63/0421 |
| 2020/0211099 | A1 | 7/2020 | Smith et al. |

OTHER PUBLICATIONS

"Fair Credit Reporting Act," https://www.consumer.ftc.gov/articles/pdf-0111-fair-credit-reporting-act.pdf, Sep. 2012.
"Summary of the HIPAA Privacy Rule," https://www.hhs.gov/hipaa/for-professionals/privacy/laws-regulations/index.html, Office for Civil Rights, Jul. 26, 2013.
Berliri et al., "Part 3: The Concept of Personal Data Revisited," https://www.hldaprotection.com/2015/06/articles/international-eu-privacy/part-3-the-concept-of-personal-data-revisited/, Hogan Lovells US LLP and Hogan Lovells International LLP, Jun. 18, 2015.
Gabe Maldoff, "Top 10 Operational Impacts of the GDPR: Part 8—Pseudonymization," https://iapp.org/news/a/top-10-operational-impacts-of-the-gdpr-part-8-pseudonymization/, International Association of Privacy Professionals, Feb. 12, 2016.
"Regulation (EU) 2016/679 of the European Parliament and of the Council of Apr. 27, 2016," https://publications.europa.eu/en/publication-detail/-/publication/3e485e15-11bd-11e6-ba9a-01aa75ed71al/language-en, Official Journal of the European Union, Apr. 27, 2016.
"GDPR Recitals and Articles, Chapter I General Provisions," https://gdpr-info.eu/art-1-gdrp/, Apr. 27, 2016.
"Police Body Worn Cameras: A Policy Scorecard," https://www.bwescorecard.org/, The Leadership Conference on Civil and Human Rights and Upturn, Nov. 2017.
Allie Shaw, "Do You Need a DVR?" https://www.reviews.org/tv-service/do-you-need-a-dvr/, Aug. 16, 2018.
"Electronic Communications Privacy Act," https://en.wikipedia.org/wiki/Electronic_Communications_Privacy_Act, Wikimedia Foundation, Inc., Mar. 14, 2019.
Amazon.com: Zmodo Wireless Security Camera System (4 Pack), https://www.amazon.com/Zmodo-Wireless-Security-Outdoor-Recording/dp/B017SD8RWO?psc=1&SubscriptionId=AKIAINYWQL7SPW7D7JCA&tag=aboutcom02thebalance-20&linkCode=sp1&camp=2025&creative=165953&creativeASIN=B017SD8RWO Retrieved on Mar. 22, 2019.
Amazon.com: ZOSI 1080P HD-TVI Security Camera System, https://www.amazon.com/ZOSI-Security-Recorder-1920TVL-Weatherproof/dp/B010EUJGBY?psc=1&SubscriptionId=AKIAINYWQL7SPW7D7JCA&tag=aboutcom02thebalance-20&linkCode=sp1&camp=2025&creative=165953&creativeASIN=B010EUJGBY Retrieved on Mar. 22, 2019.
"Fourth Amendment: An Overview," https://www.law.cornell.edu/wex/fourth_amendment, Cornell Law School, Retrieved on Apr. 11, 2019.
"IAB: California Consumer Privacy ACT (CCPA) & Digital Advertising Webinar," https://www.iab.com/wp-content/uploads/2018/11/2018-11-15-IAB-CCPA-and-Digital-Advertising.pdf, Retrieved on Apr. 11, 2019.
"IAB: California Consumer Privacy Act," https://www.iab.com/ccpa/, Retrieved on Apr. 11, 2019.
"California Consumer Privacy Act," https://en.wikipedia.org/wiki/California_Consumer_Privacy_Act, Wikimedia Foundation, Inc., Apr. 19, 2019.
Juliana D. Groot, "What is the General Data Protection Regulation? Understanding & Complying with GDPR Requirements in 2019," https://digitalguardian.com/blog/what-gdpr-general-data-protection-regulation-understanding-and-complying-gdpr-data-protection, Digital Guardian, Apr. 26, 2019.
"Electronic Code of Federal Regulations," https://www.ecfr.gov/cgi-bin/text-idx?SID=6bcd30cc55dclfc5e2dc19d3728b016b&mc=true&tpl=/ecfrbrowse/Title16/16CIsubchapF.tpl, Apr. 29, 2019.
"Advanced Smart Playback," Retrieved on Apr. 30, 2019.
Gentry et al., "Using Fully Homomorphic Hybrid Encryption to Minimize Non-interactive Zero-Knowledge Proofs," https://web.eecs.umich.edu/~cpeikert/pubs/FHENIZK.pdf, Retrieved on Apr. 30, 2019.
"Amendments to the Constitution of the United States of America," https://www.govinfo.gov/content/pkg/GPO-CONAN-1992/pdf/GPO-CONAN-1992-7.pdf, Retrieved on May 1, 2019.
Cyrus Farivar and David Ingram, "California is Bringing Law and Order to Big Data. It Could Change the Internet in the U.S." https://newsflash.one/2019/05/13/california-is-bringing-law-and-order-to-big-data-it-could-change-the-internet-in-the-u-s/, May 13, 2019.
Cyrus Farivar and David Ingram, "California's New Data Privacy Law Could Change the Internet in the US," https://www.cnbc.com/2019/05/14/california-consumer-privacy-act-could-change-the-internet-in-the-us.html, Retrieved on May 14, 2019.
"What is Streaming? How Video Streaming Works," https://www.cloudflare.com/learning/performance/what-is-streaming/, Cloudflare, Inc., Retrieved on Aug. 20, 2019.

* cited by examiner

POST-RECORDING, PRE-STREAMING, PERSONALLY-IDENTIFIABLE INFORMATION ("PII") VIDEO FILTERING SYSTEM

FIELD OF TECHNOLOGY

Aspects of the disclosure relate to a filtering system. Specifically, this disclosure relates to filtering out personally-identifiable information ("PII") from videos.

BACKGROUND

Consumers have become increasingly aware of digital services. However, consumers use of technology has frequently come at the expensive of their privacy. Every click, every purchase, every digital move generates data that is stored. This data is stored often without the consumer understanding what happens to their data.

While consumers have often sacrificed privacy by giving data, which may be seen as detrimental, businesses have become more competitive and have built better products because of their access to consumer insights and more data. Accordingly, there are two competing interests with respect to masked recordation of consumer data. Although it is unlikely that businesses will stop collecting data, there may be a shift of security and privacy practices as consumers are considering privacy less of a bonus and more of a necessity.

As a result of consumer concerns, governments have enacted more stringent privacy regulations. These regulations include, for example, the General Data Protection Regulation ("GDPR"), the Health Insurance Portability and Accountability Act ("HIPAA"), the Fair Credit Reporting Act ("FCRA"), the Electronic Communications Privacy Act ("ECPA") and the California Consumer Privacy Act.

As an example, the GDPR is a regulation of the council of the European Union on the protection of natural persons with regard to the processing of personal data and the free movement of the data. (See GDPR)

The HIPAA act states that each person . . . who maintains or transmits health insurance shall maintain reasonable and appropriate administrative, technical, and physical safeguards to ensure the integrity and confidentiality of the information. The HIPAA act further states that the safeguards should protect against any reasonably anticipated threats or hazards to the security or integrity of the information and unauthorized uses or disclosures of the information. (See HIPAA)

The FCRA allows consumers the opportunity to prohibit all solicitations referred to in such paragraph, and may allow the consumer to choose from different options when electing to prohibit the sending of such solicitations, including options regarding the types of entities and information covered, and which methods of delivering solicitations the consumer elects to prohibit. (See FCRA)

The ECPA protects wire, oral, and electronic communications while those communications are being made, are in transit, and when they are stored on computers. The act applies to email, telephone conversations and data stored electronically. (See ECPA)

The California Consumer Privacy Act grants a consumer a right to request a business to disclose the categories and specific pieces of personal information that it collects about the consumer. The act also grants a consumer a right to the request a business to disclose the categories of sources from which that information is collected. The act also grants a consumer a right to request a business to disclose the business purposes for collecting or selling the information and the categories of third parties with which the information is shared. (See California Consumer Privacy Act)

In addition to recently enacted regulations, the Fourth Amendment to the United States Constitution, protects a person against unreasonable searches and seizures. The Fourth Amendment to the United States Constitution states "The right of people to be secure in their persons, houses, papers, and effects, against unreasonable searches and seizures, shall not be violated, and no Warrants shall issue, but upon probably cause, supported by Oath or affirmation, and particularly describing the place to be searched, and the persons or things to be seized." Fourth Amendment to the United States Constitution.

Existing regulations aim to provide guidelines for processing data. It is expected that more stringent privacy regulations will be enacted to be on par with the rise of consumer expectations of privacy. These expectations include enacting proper security measures to protect personal data. The expectations also include restrictions on how data is collected.

In recent years, specifically, there have been increased expectations of privacy, from the regulations and from consumers, relating to video recording and the storage thereof. It is likely that these expectations will increase.

Examples of video recording privacy regulations include the GDPR's requirement for consent to collect personal, biometric, identifiable, and/or personally identifiable information about a person. The GDPR states that the request for consent must be given in an intelligible and easily accessible form, together with an explanation of the purpose for data processing attached to that consent. The GDPR also states that consent must be clear and distinguishable from other matters and provided in an intelligible and easily accessible form, using clear and plain language. The GDPR further states that it must be as easy to withdraw consent as it is to give it.

Additionally, the GDPR states further that the controller shall provide, to a videoed requestor, a copy of the personal data, free of charge, in an electronic format. This rule, as well as the others set forth, represents a dramatic shift to data transparency and empowerment of data subjects.

Current video technology captures everything in viewing range and does not enable selected and targeted removal of PII from a video footage segment. Therefore, in order to delete PII from a video footage segment, as may be requested by a person who was videoed, deletion of the entire video segment, that includes the requestor, is currently required using the existing video technology.

Individuals and/or entities may require the capability to identify the occurrence of an event without identifying the PII associated with event. Also, individuals and/or entities may require proof of the occurrence of an event. However, the individuals and/or entities may not want to record the PII associated with the event because of the various regulations associated with storing PII.

The conventional video recording process includes multiple stages. The stages may include video recording, video streaming and video storing.

It may be desirable to include another stage within the video recording process. It may be desirable for the additional stage to identify PII included in the video recording, and remove the identified PII prior to the streaming of the video. Such a stage may remove the automated identification of PII, and therefore, remove the onus on the videoing party to comply with regulations associated with capturing and storing PII. Such a stage may also remove the onus on the videoing party to properly secure the storage of a video including PII.

SUMMARY OF THE DISCLOSURE

A system for post-recording, pre-streaming, filtering of PII from a video is provided. The system may include a video recording device operable to record videos. The video recording device may be a stand-alone video recording device. The video recording device may be a portable video recording device. The video recording device may be a component of another device, such as a smartphone, tablet or smartwatch.

The system may also include a machine-learning, artificially-intelligent, filtering module operable to receive recorded videos from the video recording device. The machine-learning, artificially-intelligent, filtering module may also be operable to analyze the recorded videos to identify PII included in the recorded videos. The machine-learning, artificially-intelligent, filtering module may also delete the identified PII. The machine-learning, artificially-intelligent, filtering module may enable streaming of the recorded video absent the PII.

The system may also include a streaming module. The streaming module may stream the video to a physical storage medium. The physical storage medium may be included on a hard drive, a video player memory storage, a smartphone, a smartwatch, a tablet or any other suitable physical storage medium. The physical storage medium may be operable to receive the streamed recorded video absent the PII.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
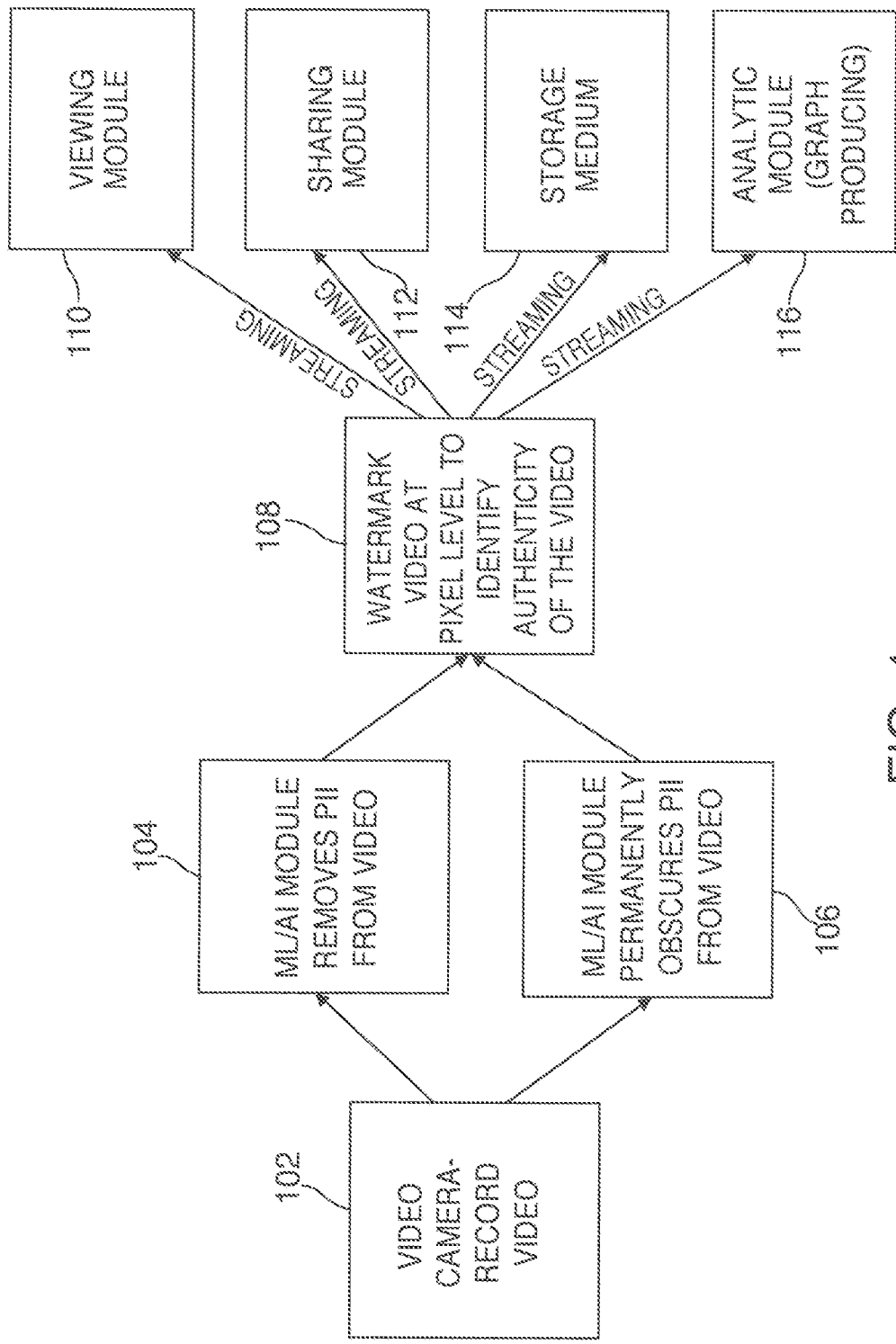
FIG. 1 shows an illustrative diagram in accordance with principles of the disclosure.

Apparatus and methods for post-recording, pre-streaming, pre-storing, filtering of videos that include personally-identifiable information ("PII") is provided. The method may include recording a video using a video recording device. The video recording device may be a smartphone, tablet, smartwatch, traditional video camera or any other suitable video recording device.

The method may include receiving the recorded video at a machine-learning, artificially-intelligent, filtering module. The machine-learning, artificially-intelligent, filtering module may analyze the recorded video to identify PII included in the recorded video.

The machine-learning, artificially-intelligent filtering module may use historical information to determine what is PII. The historical information may include historical videos and the PII that was previously identified within the historical videos. The historical information may also include information relating to the location of the video recording device. For example, a filtering module associated with a first video recording device may identify hair type and hair color as PII based on historical information. In another example, a filtering module associated with a second video recording device may identify facial features as PII based on historical information.

The machine-learning, artificially-intelligent filtering module may also utilize user selection to determine what is PII. A user may be presented a checklist. The checklist may include various features that may be considered PII. Such features may include facial features, biometric data, car data and color data. Each feature may include sub-features. For example, facial features may include eye features, hair features, mouth features and skin tone as sub-features. Biometric data may include iris and fingerprint as sub-features. Car data may include license plate number and car company as sub-features. Color data may include clothing and shoes, moving objects and non-moving objects as sub-features.

The method may include permanently deleting the identified PII. The method may include enabling streaming of the recorded video absent the deleted PII. The method may include streaming the recorded video absent the PII. The method may include receiving the recorded video absent the PII at a physical storage medium.

In some embodiments, the PII identification and selection may be fully automated. A fully automated module, or series of modules, may determine what is PII and completely remove the determined PII from the video. The fully automated module may also stream the video to a storage medium.

The identifying of the PII may be based on user selection of one or more predetermined categories. The predetermined categories may include facial data, color data, biometric data, license plate data, car company data or clothing data, as described above. The method may also include using biometric recognition technology to identify the PII. In some embodiments, the selection may be performed by the filtering module. The filtering module may use historical information to determine the selection. The filtering module may consider time of day, amount of light in the location and/or any other suitable conditions when determining the selection.

The method may also include invisibly watermarking the recorded video. The watermarking may be prior to enabling streaming of the recorded video. The watermarking may be pixel modification watermarking. The watermarking may make certain that the recorded video is not tampered with between recording and storing.

Because the PII may not be included in the video, there may be gaps included in the video slides. Therefore, the system may fill in the gaps using background fill or other suitable methods. As a result of the background fill, there may be an opportunity for a malicious actor to tamper with the video and place an incriminating picture or video slide within the gap. However, with the video watermarking, the video cannot be tampered with after the watermarking without such efforts being detected. Specifically, the pixel modification watermarking may watermark each pixel within the video. Therefore, no pixel may be altered after the watermarking. This provides an additional level of security.

The method may also include providing a user with a tool to identify the PII. The tool may be a software tool. The software tool may enable the user to select various possible categories of PII. The selected PII categories may be removed from the video prior to streaming the video to a physical storage medium.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative diagram. A video camera may record a video, as shown at 102. The video camera may be a standalone security camera. The video camera may be a component of a security system. The video camera may be a component of a computing device, such as a smartphone, smartwatch, tablet, personal computer or other suitable computing device.

The video camera may be a mobile video camera. One example of a mobile video camera may be a wearable video camera. Wearable video cameras may be worn on a body of an individual. The individual may be a law enforcement individual. The individual may be any other suitable individual.

Another example of a mobile video camera may be a vehicle camera. Vehicle cameras may be attached to vehicles, such as cars, busses, ATVs, trucks or any other suitable vehicle. The vehicle cameras may video surrounding footage while stationary or in motion.

The video camera may be a stationary video camera. The stationary video camera may be situated in a home. The video camera may be stationed in an office. The video camera may be stationed in a store. The video camera may be stationed in a food establishment. The video camera may be stationed in any other suitable location.

A stationary video camera may be used for a variety of reasons. One reason may be security. An office or store may video the premises and its surrounding locations to ensure that a malicious actor may be deterred from maliciously retrieving goods or contents. Security cameras may deter malicious actors because their malicious acts may be videoed. Video cameras in offices or stores may also ensure that there was no tampering with certain goods or equipment.

Another reason that a stationary video camera may be used is to ensure that certain actions were executed. For example, a store owner may want confirmation that his or her store was open at 9:00 AM. The store owner may video the store and be able to ascertain if the lights were on and the front door was unlocked by 9:00 AM.

In another example, a home or building owner may want confirmation that, after household help leaves the home or building, the air conditioning or heat was set correctly and that the external doors were properly secured.

In another example, a property owner may want confirmation of damage or disaster that occurred to the property. The confirmation may be used for insurance purposes. Insurance companies may require proof of damage in order to compensate for the damage. A recorded video may be sufficient proof of damage. The insurance companies may not require PII for proof of damage.

Insurance companies may also require proper due diligence after a damage or disaster. A recorded video of the executing of proper due diligence may be sufficient proof of due diligence. The insurance companies may not require PII for proof of due diligence.

The recorded video may be transmitted to module 104 or module 106. ML/AI (machine learning/artificial intelligence) module 104 may remove any PII from the video. ML/AI module 106 may permanently obscure the PII from the video. The permanent obscuring may be blacking out, blurring, encryption beyond encryption or any other suitable permanent obscuring.

The filtered video may be transmitted to module 108. Module 108 may watermark the video at the pixel level to identify and stamp the authenticity of the video.

Upon watermarking, the filtered, watermarked video may be streamed to another module. The module may be a viewing module, as shown at 110. The viewing module may enable a user to view the filtered video. The viewing module may be a video screen, smartphone, tablet or other suitable viewing module.

The module may be a sharing module, as shown at 112. The sharing module may enable a user to share the filtered video. The sharing may be via a sharing platform, email, or any other suitable sharing method.

The module may be a storage medium, as shown at 114. The storage medium may be a hard drive, a portion of a hard drive, a memory on a smart device or any other suitable storage medium.

The module may be an analytic module, as shown at 116. The analytic module may be graph producing. The analytic module may perform analytics on the filtered video to determine, in the videoed location, malicious activity, high traffic times, low traffic times or any other suitable analytics. The analytic module may produce graphs or other suitable analytic charts.

It should be appreciated that viewing module 110, sharing module 112, storage medium 114 and analytic module 116 may communicate with each other and may operate together.

Figure 2:
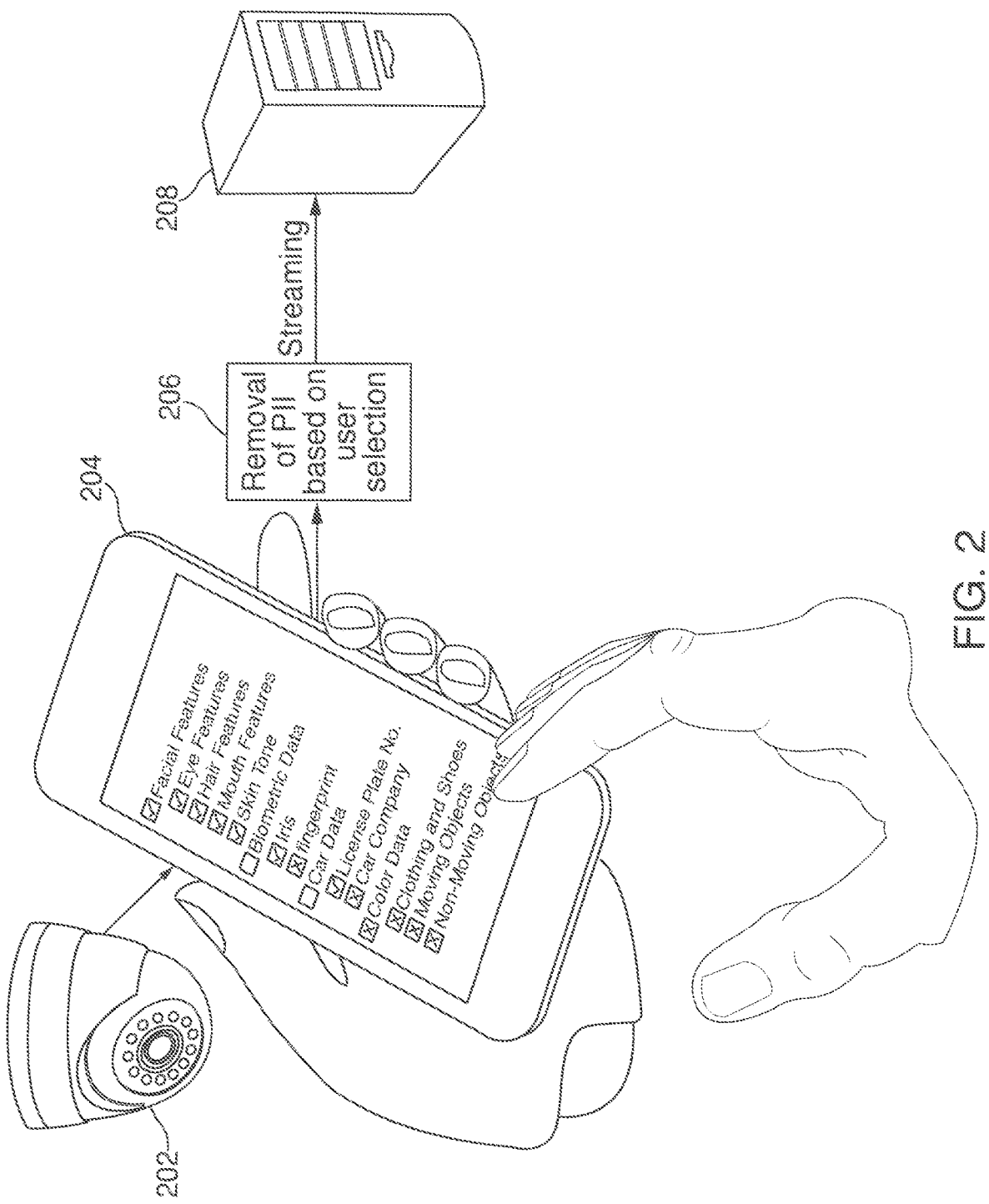
FIG. 2 shows another illustrative diagram in accordance with principles of the disclosure.

FIG. 2 shows a pictorial view of the flow of data between video camera 202 and storage device 208. Video camera 202 may transmit recorded video to an ML/AI filtering module. The ML/AI filtering module may be customized by a user, as shown at 204.

The user may have selected all facial features, fingerprint data and license plate number data to be considered PII. The ML/AI filtering module may remove the PII based on the user selection, as shown at 206.

The filtered video may then be streamed to server 208. Server 208 may be in communication with various modules. The modules may enable viewing, sharing and analyzing of the filtered video.

Figure 3:
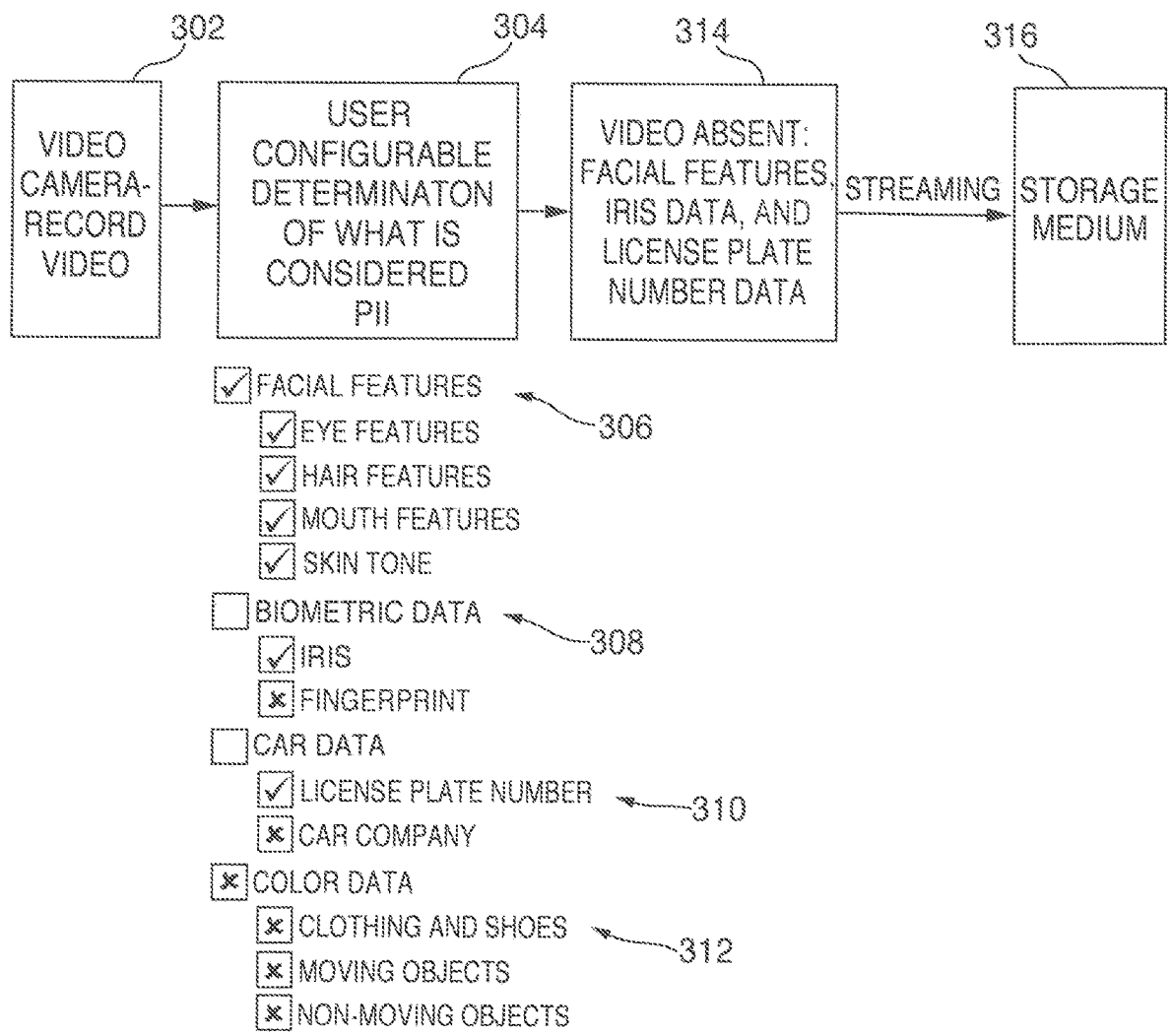
FIG. 3 shows yet another illustrative diagram in accordance with principles of the disclosure.

FIG. 3 shows an illustrative flow chart. Step 302 showing recording a video. Step 304 shows a user configurable determination of what is considered PII. An exemplary checklist includes facial features 306, biometric data 308, car data 310 and color data 312. It should be appreciated that the checklist may be dynamically updated using the ML/AI filtering module.

Step 314 shows the video absent facial features, iris data and license plate number data. The video may be streamed to storage medium 316.

Thus, systems and methods for a post-recording, pre-streaming, PII video filtering system have been provided. persons skilled in the art will appreciate that the present invention can be practiced by other than the described embodiments, which are presented for purposes of illustration rather than of limitation.

What is claimed is:

1. A system for post-recording, pre-streaming, pre-storing video filtering and processing of personally-identifiable information ("PII"), the system comprising:
a video recording device operable to record a video;
a machine-learning, artificially-intelligent filtering module operable to, prior to storing the recorded video:
receive the recorded video from the video recording device, said recorded video comprising PII video data and public video data;
analyze the recorded video to identify the PII video data included in the recorded video;
permanently delete and shred the identified PII video data from the recorded video, reducing security associated therewith;
post-shredding, invisibly watermark the public video data with a pixel modification watermark that watermarks each pixel within the public video data; and
enable streaming of the public video data independent of the PII video data;
a streaming module that streams the public video data, independent of the PII video data, to an unsecured physical storage medium;
the unsecured physical storage medium operable to receive and store the recorded streamed public video data independent of the PII video data; and
wherein the identifying of the PII video data is based on user selection of a hierarchy of one or more predetermined categories, and a plurality of selectable options within the predetermined categories, said predetermined categories comprising:
facial data, said facial data comprising selectable options, said facial data selectable options comprising:
eye features;
hair features; and
mouth features;
color data, said color data comprising selectable options, said color data selectable options comprising:
clothing and shoes;
moving objects; and
non-moving objects;
biometric data, said biometric data comprising selectable options, said biometric data selectable options comprising:
iris; and
fingerprint; and
car data comprising selectable options, said car data selectable options comprising:
license plate data; and
car company data.

2. The system of claim 1, wherein the machine-learning, artificially-intelligent filtering module uses facial recognition technology to identify the PII video data.

3. The system of claim 1, wherein the machine-learning, artificially-intelligent filtering module uses biometric recognition technology to identify the PII video data.

4. The system of claim 1, the system further comprising a platform for providing a user with a tool to identify PII video data.

5. A system for post-recording, pre-streaming video filtering of personally-identifiable information ("PII"), the system comprising:
a video recording device operable to record a video;
a machine-learning, artificially-intelligent filtering module operable to, prior to storing the recorded video:
receive a recorded video from the video recording device, said recorded video comprising PII video data and public video data;
analyze the recorded video to identify the PII video data included in the recorded video;
permanently delete and shred remove the identified PII video data from the recorded video, reducing security associated therewith;
post-permanently deleting and shredding the identified PII video data, invisibly watermark the public video data with a pixel modification watermark that watermarks each pixel within the public video data; and
enable streaming of the public video data independent of the PII video data;
a streaming module that streams the public video data, independent of the PII video data, to an unsecured physical storage medium;
the unsecured physical storage medium operable to receive and store the recorded streamed public video data independent of the PII video data; and
wherein the identifying of the PII video data is based on user selection of a hierarchy of one or more predetermined categories, and a plurality of selectable options within the predetermined categories, said predetermined categories comprising:
facial data, said facial data comprising selectable options, said facial data selectable options comprising:
eye features;
hair features; and
mouth features;
color data, said color data comprising selectable options, said color data selectable options comprising:
clothing and shoes;
moving objects; and
non-moving objects;
biometric data, said biometric data comprising selectable options, said biometric data selectable options comprising:
iris; and
fingerprint; and
car data comprising selectable options, said car data selectable options comprising:
license plate data; and
car company data.

6. The system of claim 5, wherein the machine-learning, artificially-intelligent filtering module uses facial recognition technology to identify the PII video data.

7. The system of claim 5, wherein the machine-learning, artificially-intelligent filtering module uses biometric recognition technology to identify the PII video data.

8. The system of claim 5, the system further comprising a platform for providing a user with a tool to identify PII video data.

9. A method for post-recording, pre-streaming filtering of videos that include personally-identifiable information ("PII"), the method comprising:
- recording a video using a video recording device;
- receiving the recorded video at a machine-learning, artificially-intelligent filtering module, said recorded video comprising PII video data and public video data;
- prior to storing the recorded video, analyzing the recorded video to identify the PII video data included in the recorded video;
- permanently deleting and shredding the identified PII video data from the recorded video, reducing security associated therewith;
- post-permanently deleting and shredding the identified PII video data, enabling streaming of the public video data independent of the PII video data;
- invisibly watermarking the public video data with a pixel modification watermark that watermarks each pixel within the public video data;
- streaming the public video data independent of the PII video data;
- receiving and storing the public video data independent of the PII video data at an unsecured physical storage medium; and wherein the identifying of the PII video data is based on user selection of a hierarchy of one or more predetermined categories, and a plurality of selectable options within the predetermined categories, said predetermined categories comprising:
- facial data, said facial data comprising selectable options, said facial data selectable options comprising:
  - eye features;
  - hair features; and
  - mouth features;
- color data, said color data comprising selectable options, said color data selectable options comprising:
  - clothing and shoes;
  - moving objects; and
  - non-moving objects;
- biometric data, said biometric data comprising selectable options, said biometric data selectable options comprising:
  - iris; and
  - fingerprint; and
- car data comprising selectable options, said car data selectable options comprising:
  - license plate data; and
  - car company data.

10. The method of claim 9, further comprising providing a user with a tool to identify the PII video data.

11. The method of claim 9, further comprising using biometric recognition technology to identify the PII video data.

* * * * *